Patented Aug. 4, 1953

2,647,909

UNITED STATES PATENT OFFICE 2,647,909

PARTIAL SYNTHESIS OF PREGNENOLONE

Frederick W. Heyl and Milton E. Herr, Kalamazoo, Mich., assignors to The Upjohn Company, Kalamazoo, Mich., a corporation of Michigan No Drawing. Application June 26, 1950,
Serial No. 170,470

16 Claims. (Cl. 260—397.4)

1

The present invention is concerned with a novel synthesis of pregnenolone and to important intermediates in such a synthesis. The invention particularly relates to the synthesis of pregnenolone from 3-substituted-22-cyano-22-halo-bisnor-5-cholenes by a series of reactions involving conversion of an alpha halonitrile by dehydrohalogenation, ozonolysis, and decomposition of the ozonide to pregnenolone or a 3-substituted derivative thereof.

Heretofore, pregnenolone, a valuable steroid compound, has been synthesized (United States Patents 2,232,438 and 2,313,732) from a 3-substituted-bisnor-cholenic acid by a complicated series of reaction steps including conversion to the methyl ester, reaction with a large excess of phenyl magnesium bromide, dehydration of the alcohol to a diphenyl-ethylene compound, and oxidation of the side-chain double bond to a carbonyl group. The overall yields of such a process have been poor and the process required an excessive number of manipulations as well as expensive and dangerous reagents.

It is an object of this invention to provide a new and improved process for the synthesis of pregnenolone and its derivatives whereby better overall yields of the product may be obtained with less manipulation. Other objects will become apparent hereinafter.

The series of reactions comprising the method of the present invention is outlined schematically in the following illustrative diagram, wherein R represents a hydroxyl group or a group convertible thereto and X is chlorine or bromine.

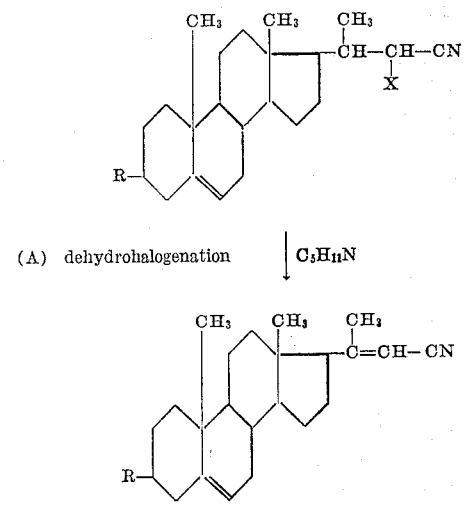

(A) dehydrohalogenation $\quad\downarrow C_5H_{11}N$

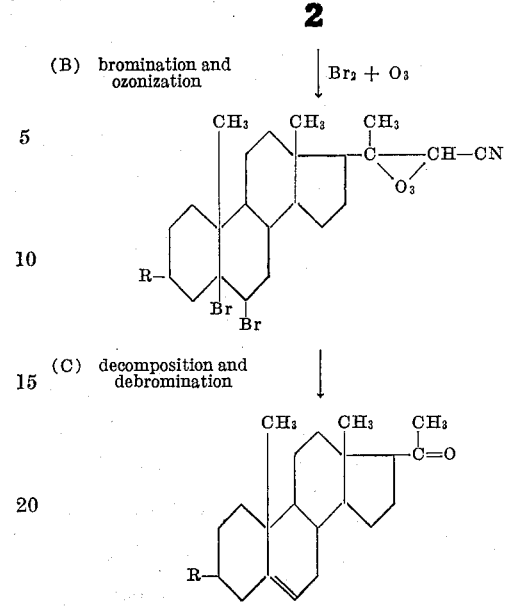

The starting compounds for the process of the present invention can be prepared by reacting a 3-substituted bisnor-5-cholen-22-al cyanhydrin with phosphorus oxybromide or phosphorus oxychloride, as described in our copending application Serial 145,894, filed February 23, 1950. 3-substituted - 22-cyano-22-halo-bisnor-5-cholenes wherein the 3-substituent is convertible to a hydroxy group, which may be used as starting materials, include: 3-formoxy-22-bromo-22-cyano-bisnor-5-cholene, 3-acetoxy-22-chloro - 22 - cyano-bisnor-5-cholene, 3-propionyloxy-22-bromo-22-cyano-bisnor-5-cholene, 3-isobutyroyloxy-22-chloro-22-cyano-bisnor-5-cholene, 3-(tert - heptoyloxy)-22-bromo-22-cyano-bisnor-5 - cholene, 3-benzoyloxy-22-bromo-22-cyano-bisnor-5 -cholene, 3-(para-toluyloxy)-22 - chloro-22 - cyano-bisnor-5-cholene, 3-(alpha-naphthoyloxy) - 22-bromo-22-cyano-bisnor-5-cholene, 3 - methoxy-22-chloro-22-cyano-bisnor-5-cholene, 3 - isopropoxy-22-bromo-22-cyano-bisnor - 5 - cholene, 3-iso-octyloxy-22-chloro-22-cyano-bisnor - 5-cholene, 3-cyclohexyloxy-22-bromo-22 - cyano - bisnor-5-cholene, 3-benzyloxy-22-chloro-22-cyano-bisnor-5-cholene, and the like, as well as 3-hydroxy-22-chloro- or bromo-22-cyano-bisnor-5-cholene.

STEP (A).—DEHYDROHALOGENATION

The first step of the process of the present invention is the elimination of hydrogen and halogen from the 20 and 22 positions to introduce a double bond between carbon atoms 20 and 22. Unexpectedly, this can be accomplished by heating a solution of a 3-substituted-22-cyano-22-halo-bisnor-5-cholene in piperidine to between about fifty degrees centigrade and the boiling point of the reaction mixture under the conditions employed, preferably about 100 degrees centigrade, and thereafter isolating the resulting 3-substituted-22-cyano-bisnor-5,20(22) - choladiene. This, despite the fact that most of the ordinary dehydrohalogenating agents were inoperative in this step of our process. Thus, pyridine, quinoline, lutidine, and the like, do not remove the hydrogen and halogen, while dimethylaniline removed the halogen by reduction, resulting in a compound saturated at carbon atoms 20 and 22.

The ester or ether group in the 3-position can be cleaved to a free hydroxyl group if desired; the esters being readily hydrolyzed by potassium carbonate in aqueous methanol, while the ethers are hydrolyzable by acids in the usual manner. When a hydroxy compound is used in Step A, the resulting 3 - hydroxy - 22 - cyano - bisnor-5,20(22)-choladiene can be acylated or etherified prior to oxidation if desired. A preferred procedure is the use of a 3-ether or a 3-ester, which are more resistant to oxidation than is the 3-hydroxy, in the following step of the process.

The compounds thus obtained, being substituted ethylenes, are capable of existing in two geometric forms, i. e., cis and trans. In most instances, both forms have been isolated and characterized. They are crystalline solids soluble in methanol, ethanol, acetone, benzene, chloroform, and the like, slightly soluble in hexane, petroleum ether, and the like, and insoluble in water. Since the double bond which accounts for these two forms is subsequently removed from the molecule by oxidation, it is a preferred embodiment of this invention to use an unresolved mixture of said isomers in the subsequent step.

STEP (B).—BROMINATION AND OZONIZATION

Protection of the 5:6 double bond prior to ozonization is accomplished by adding a molar equivalent of bromine to a solution of a 3-substituted-22-cyano-bisnor-5,20(22)-choladiene in a suitable solvent at or below room temperature. The solution of the 5,6-dibromide thus formed can be ozonized without changing the solvent if one also suitable for ozonization has been selected. Suitable solvents for both the bromination and ozonization include: chloroform, carbon tetrachloride, mixtures of ether and chloroform, glacial acetic acid and methylene chloride. The addition of ozone can be accomplished at temperatures between about plus twenty and minus eighty degrees centigrade, but preferably between zero and five degrees centigrade. A sufficient amount of ozone should be passed into the solution to assure complete formation of an ozonide by all of the steroid material present. An excess of ozone over the stoichiometric amount is preferable, but a large excess is to be avoided as it may cause undesirable secondary reactions. Thus, the amount of ozone used will vary between about 1.5 and 4.5 moles of ozone per mole of steroid material present. The ozonide thus formed, if desired, can be isolated prior to its decomposition, but a preferred form of the present invention contemplates the more usual procedure of decomposing an ozonide without previous isolation.

STEP (C).—DECOMPOSITION AND DEBROMINATION

The next step in the method of this invention is the decomposition of the ozonide and treatment to reintroduce the 5:6 double bond. Any of the usual procedures for decomposing ozonides are satisfactory such as by steam distillation or adding this ozonide to boiling acetic or propionic anhydride, to liquid ammonia, to a concentrated aqueous solution of potassium bisulfite, to a dilute solution of sodium bisulfite, to a mixture of powdered zinc and water, or to a mixture of powdered zinc and glacial acetic acid, however, reductive decomposition with zinc and acetic acid is preferred. The 5:6-double bond can be restored by dehalogenation simultaneously with the decomposition of the ozonide or the two reactions can be accomplished step-wise, if desired, the halogen being removed by any of the methods known in the art. The two reactions can be accomplished in either order, but a preferred procedure is the simultaneous accomplishment of these reactions.

Simultaneous debromination and decomposition is obtained readily by adding an excess of powdered zinc to a glacial acetic solution of the di-halo ozonide and warming the mixture to between about ninety and about one hundred degrees centigrade for approximately ten minutes. The product, pregnenolone, or pregnenolone ester or ether, can be isolated by removing the excess zinc by filtration, and the acetic acid by distillation under reduced pressure. This product can be purified, if desired, by various procedures, one of which involves its solution in ether, washing the ether solution with water, and aqueous sodium bicarbonate, drying, and removing the ether. Still further purification can be accomplished through the preparation of a semicarbazone, by refluxing a methanol solution of the above product with semicarbazide hydrochloride and recovering the semicarbazone from the reaction mixture. The 17-carbonyl group can be restored by heating a solution of the semicarbazone in an ethanol-water-sulfuric acid solution, diluting with water, and recovering a pure product from the water solution.

As is conventional with ozonizations, when conducted in a solvent other than glacial acetic acid, the solvent used for the ozonization can be replaced by glacial acetic acid after completion of the ozonization by adding the glacial acetic acid to the ozonide solution and removing the lower boiling solvent by fractional distillation under reduced pressure, with introduction of additional acetic acid, if necessary. Or, if desired, the ozonide can be isolated as previously mentioned and then dissolved in glacial acetic acid. However, we do not limit ourselves to glacial acetic acid as the solvent for the decomposition of the ozonide, the usual solvents also being suitable.

The 3-substituted pregnenolone compounds thus produced can be isolated, if the zinc and acetic acid process is used, by filtering off the zinc and diluting the acetic acid solution with water, or preferably, after filtering off the zinc, the acetic acid solution is diluted with several volumes of ether, washed with water, dilute sodium bicarbonate solution, dried, and the solvent removed. A still further modification contemplates the isolation of said pregnenolone compounds by way of their highly crystalline semicarbazones. This can be accomplished by refluxing a methanol solution of a said pregnenolone compound, e. g., that obtained by dilution of the acetic acid with water as previously described, with semicarbazide hydrochloride and sodium acetate.

Among the 3-substituted pregnenolone compounds which can thus be prepared and which are within the scope of this invention are pregnenolone, pregnenolone acetate, pregnenolone isobutyrate, pregnenolone cyclohexanoate, pregnenolone benzoate, pregnenolone alpha-toluate, pregnenolone methyl ether, pregnenolone isopropyl ether, pregnenolone isooctyl ether, pregnenolone benzyl ether, and the like.

The following examples are given by way of illustration only and are not to be construed as limiting.

PREPARATION 1.—3(BETA)-ACETOXY-BISNOR-5-CHOLEN-22-AL CYANHYDRIN

A mixture of 0.5 gram of 3(beta)-acetoxy-bisnor-5-cholen-22-al, 1.5 milliliter of dioxane, and three milliliters of forty percent aqueous sodium bisulfite was stirred at room temperature for thirty minutes, 0.5 gram of potassium cyanide added, and the mixture heated on a steam bath to about ninety degrees centigrade for five minutes. The resulting solution was allowed to stand for thirty minutes and poured into fifty milliliters of water. A resulting gummy precipitate was separated by decantation and crystallized from aqueous acetic acid. There was thus obtained 0.48 gram of 3(beta)-acetoxy-bisnor-5-cholen-22-al cyanhydrin which melted at 170-175 degrees centigrade.

In a manner essentially as described, 3-formoxy-bisnor-5-cholen-22-al cyanhydrin, 3-isobutyroyloxy-5-cholen-22-al cyanhydrin, 3-benzoyloxy-bisnor-5-cholen-22-al cyanhydrin, 3-(ortho-toluyloxy)-bisnor-5-cholen-22-al cyanhydrin and 3-(alpha-naphthoyloxy)-bisnor-5-cholen-22-al cyanhydrin can also be prepared.

PREPARATION 2.—3-METHOXY-BISNOR-5-CHOLEN-22-AL CYANHYDRIN

In a manner essentially as described in Preparation 1, 3-methoxy-bisnor-5-cholen-22-al cyanhydrin, melting at 200 to 205 degrees centigrade was prepared from 3-methoxy-bisnor-5-cholen-22-al.

In a like manner 3-propoxy-bisnor-5-cholen-22-al cyanhydrin, 3-isobutoxy-bisnor-5-cholen-22-al cyanhydrin, 3-cyclohexyloxy-bisnor-5-cholen-22-al cyanhydrin, and 3-benzyloxy-bisnor-5-cholen-22-al cyanhydrin can also be prepared.

PREPARATION 3.—3-METHOXY-22-CHLORO-22-CYANO-BISNOR-5-CHOLENE

A solution of 0.3 gram of 3-methoxy-bisnor-5-cholen-22-al cyanhydrin and 0.6 milliliter of phosphorus oxychloride in four milliliters of lutidine was heated under reflux for ten minutes, poured into a mixture of ten grams of ice and ten milliliters of concentrated hydrochloric acid, and extracted five times with equal volumes of ether. The organic extracts were combined, washed with an equal volume of five percent sodium bicarbonate solution, water, and dried. The solvent was removed by distillation and the residue crystallized from dilute acetone and 95 percent ethanol to obtain 0.29 gram of 3-methoxy-22-chloro-22-cyano-bisnor-5-cholene which melted at 169 to 171 degrees centigrade.

In a manner essentially as described, 3-(n-propoxy)-22-chloro-22-cyano-bisnor-5-cholene, 3-isobutoxy-22-bromo-22-cyano-bisnor-5-cholene, 3-cyclohexyloxy-22-bromo-22-cyano-bisnor-5-cholene and 3-benzyloxy-22-chloro-22-cyano-bisnor-5-cholene can be prepared.

PREPARATION 4.—3(BETA)-ACETOXY-22-BROMO-22-CYANO-BISNOR-5-CHOLENE

A solution of one gram of 3(beta)-acetoxy-bisnor-5-cholen-22-al cyanhydrin in ten milliliters of dry pyridine was added at a substantially uniform rate over a period of ten minutes to a stirred solution of one gram of phosphorus oxybromide in ten milliliters of dry pyridine, heated under reflux for twenty minutes, poured into a mixture of concentrated hydrochloric acid, and extracted five times with equal volumes of ether. The organic extract was washed with an equal volume of five percent sodium bicarbonate solution, water, and dried. Upon removal of the solvent by distillation and crystallization of the residue, there was obtained 1.04 gram of 3(beta)-acetoxy-22-bromo-22-cyano-bisnor-5-cholene, which melted at 187 to 188 degrees centigrade.

In a manner essentially as described, 3-formoxy-22-bromo-22-cyano-bisnor-5-cholene, 3-isobutyroyloxy-22-chloro-22-cyano-bisnor-5-cholene, 3(alpha)-toluyloxy-22-bromo-22-cyano-bisnor-5-cholene, 3-benzoyloxy-22-chloro-22-cyano-bisnor-5-cholene, and 3-(alpha)-naphthoyloxy-22-bromo-22-cyano-bisnor-5-cholene can be prepared.

PREPARATION 5.—3-HYDROXY-22-BROMO-22-CYANO-BISNOR-5-CHOLENE

A mixture of 4.6 grams of 3-acetoxy-22-bromo-22-cyano-bisnor-5-cholene, 1.4 grams of potassium carbonate, twenty milliliters of water, and 150 milliliters of methanol was heated under reflux for one-half hour, the solvent removed under reduced pressure, and the residue extracted with three 100-milliliter portions of ether. The organic extract was washed with water and dried. Upon removal of the solvent there was obtained 4.05 grams of 3-hydroxy-22-bromo-22-cyano-bisnor-5-cholene melting at 225 to 235 degrees centigrade.

*Example 1.—3-acetoxy-22-cyano-bisnor-5,20(22)-choladiene*

A solution of 4.8 grams of 3-acetoxy-22-bromo-22-cyano-bisnor-5-cholene in 200 milliliters of dry piperidine was heated under reflux for two hours, the excess piperidine removed by distillation under reduced pressure, and the residue extracted with 200 milliliters of ether. The organic extract was washed with equal volumes of five percent hydrochloric acid, five percent sodium carbonate solution, water, and dried. Upon evaporation of the solvent there was obtained 3.53 grams of an isomeric mixture containing both the cis and trans forms of 3-acetoxy-22-cyano-bisnor-5,20(22)-choladiene.

In a similar manner 3-formoxy-22-cyano-bisnor-5,20(22)-choladiene, 3-isobutyroyloxy-22-cyano-bisnor-5,20(22)-choladiene, and 3-benzoyloxy-22-cyano-bisnor-5,20(22)-choladiene can also be prepared.

*Example 2.—3-methoxy-22-cyano-bisnor-5,20(22)-choladiene*

A solution of 3.9 grams of 3-methoxy-22-chloro-22-cyano-bisnor-5-cholene in 150 milliliters of dry piperidine was heated under reflux for two hours, the excess piperidine removed by distillation under reduced pressure, and the residue extracted with 150 milliliters of ether. The organic solution was washed with equal volumes of five percent hydrochloric acid, five percent sodium carbonate solution, water, and dried. Upon evaporation of the solvent there was obtained 2.85 grams of an isomeric mixture of cis and trans forms of 3-methoxy-22-cyano-bisnor-5,20(22)-choladiene.

In a manner essentially as described 3-isopropoxy-22-cyano-bisnor-5,20(22)-choladiene, 3-cyclohexyloxy-22-cyano-bisnor-5,20(22)-choladiene, and 3-benzyloxy-22-cyano-5,20(22)-choladiene can also be prepared.

*Example 3.—3 - hydroxy - 22 - cyano-bisnor-5,20-(22)-choladiene*

A mixture of 3.53 grams of 3-acetoxy-22-cyano-bisnor-5,20(22)-choladiene (obtained from the procedure of Example 1), 1.61 grams of potassium carbonate, twenty milliliters of water, and 150 milliliters of methanol was heated under reflux for one-half hour, the solvent removed by distillation under reduced pressure and the residue added to a mixture of fifty milliliters of water and 100 milliliters of ether. The layers were separated and the organic layer washed with equal volumes of five percent sodium carbonate solution, water, and dried. The organic solution was concentrated to a volume of 25 milliliters and placed in a refrigerator. The crystals were separated by filtration and recrystallized from 95 percent ethanol. There was thus obtained 0.51 gram of 3 - hydroxy - 22 - cyano-bisnor-5,20(22) - choladiene, melting at 234 degrees centigrade, being probably the trans form.

*Example 4.—3 - hydroxy - 22 - cyano-bisnor-5,20-(22)-choladiene*

A solution of 4.6 grams of 3-hydroxy-22-bromo-22-cyano-bisnor-5-cholene in 200 milliliters of dry piperidine was heated under reflux for two hours, the excess piperidine removed by distillation under reduced pressure, and the residue extracted with 200 milliliters of ether. The organic extract was washed with equal volumes of five percent hydrochloric acid, five percent sodium carbonate solution, water, and dried. Upon evaporation of the solvent, there was obtained 1.95 grams of 3 - hydroxy-22-cyano-bisnor-5,20(22) - choladiene as an isomeric mixture melting at 165 to 168 degrees centigrade.

*Example 5.—Cis and trans 3-acetoxy-22-cyano-bisnor-5,20(22)-choladiene*

A solution of 0.9 gram of 22-cyano-bisnor-5,20-(22)-choladien-3-ol, melting at 234 degrees centigrade, in eight milliliters of pyridine and 1.5 milliliters of acetic anhydride was heated at 100 degrees centigrade for five minutes and then allowed to stand at room temperature for 68 hours. The solution was then poured into a mixture of fifteen grams of ice and fifteen milliliters of concentrated hydrochloric acid, and the precipitate dissolved in fifty milliliters of ether. The organic extract was washed with equal volumes of water, five percent sodium carbonate solution, water, and dried. Upon removal of the solvent by distillation and recrystallization of the residue from dilute acetone, there was obtained 0.92 gram of 3 - acetoxy-22-cyano-bisnor-5,20(22)-choladiene, which melted at 182 degrees centigrade.

When 1.51 grams of 22-cyano-bisnor-5,20(22)-choladien-3-ol melting at 195 degrees centigrade was treated in the same manner, 1.55 grams of 3 - acetoxy-22-cyano-bisnor-5,20(22)-choladiene, which melted at 148 degrees centigrade was obtained.

In a like manner cis and trans forms of 22-cyano - bisnor - 5,20(22) - choladien-3-ol can be transformed into cis and trans 3-propionyloxy-22-cyano-bisnor-5,20(22)-choladiene with propionic anhydride, cis and trans forms of 3-butyryloxy - 22 - cyano-bisnor-5,20(22) - choladiene with butyric anhydride, cis and trans 3-heptoyloxy 22 - cyano - bisnor-5,20(22)-choladiene with heptoic anhydride, and 3-benzoyloxy-22-cyano-bisnor-5,20(22)-choladiene with benzoic anhydride.

*Example 6.—Pregnenolone acetate*

(a) To a solution of 0.5 gram of 3-acetoxy-22-cyano-bisnor-5,20(22)-choladiene, melting point 182 degrees centigrade, in ten milliliters of benzene, cooled to about zero degrees centigrade, was added dropwise over a period of five minutes 6.4 milliliters of chloroform containing 0.21 gram of bromine, followed by 260 milligrams of ozone at a rate of ten milligrams per minute. Solvent was then removed by distillation under reduced pressure, keeping the temperature below thirty degrees centigrade. The ozonide was dissolved in a mixture of ten milliliters of glacial acetic acid and ten milliliters of ether, shaken for ten minutes with one gram of zinc dust, and diluted with 130 milliliters of ether. Excess zinc was filtered off and the organic solution washed with equal volumes of water, five percent sodium hydroxide, water, and dried. Upon evaporation of the solvent, and crystallization of the residue from dilute alcohol, there was obtained 0.46 gram of pregnenolone acetate, melting at 145 to 146 degrees centigrade.

(b) In a manner similar to that described in part (a), 0.45 gram of pregnenolone acetate was obtained from 0.5 gram of 3-acetoxy-22-cyano-bisnor-5,20(22)-choladiene, melting at 148 degrees centigrade.

(c) To a solution of 1.61 grams of crude 3-acetoxy - 22 - cyano-bisnor-5,20(22)-choladiene, containing both cis and trans isomers, obtained as described in Example 1, in 100 milliliters of chloroform cooled to about zero degrees centigrade, was added 21.5 milliliters of chloroform containing 674 milligrams of bromine, followed by 73 milligrams of ozone at the rate of 14.6 milligrams per minute. The ozonide was then decomposed and the product isolated essentially as described in part (a). The pregnenolone acetate thus obtained was dissolved in thirty milliliters of methanol, one gram of sodium acetate and four milliliters of water added and the mixture refluxed for ten minutes. Upon cooling, 0.54 gram of 3-acetoxy-5-pregnen-20-one semicarbazone, melting at 240 to 243 degrees centigrade, was obtained.

*Example 7.—Pregnenolone methyl ether*

To a solution of 353 milligrams of 3-methoxy-22-cyano-bisnor-5,20(22)-choladiene dissolved in 25 milliliters of chloroform, cooled to five degrees centigrade, there was added dropwise a solution of 158 milligrams of bromine in five milliliters of chloroform. The resulting solution of 3-methoxy - 5,6 - dibromo - 22 - cyano-bisnor-20(22)-cholene in chloroform was ozonized by bubbling into the solution cooled to five degrees centigrade about 7.2 milligrams of ozone per minute for thirty minutes. The solvent was then removed under reduced pressure and at a temperature below thirty degrees centigrade and the residue dissolved in twenty milliliters of glacial acetic acid. One-half gram of zinc dust was carefully added to the acetic acid to decompose the ozonide and remove the bromine and the resulting product was extracted with ether. The ethereal solution was washed with five percent sodium hydroxide solution and water until neutral, dried and the ether removed. There was thus obtained 330 milligrams of an oil which was heated under reflux for one hour with thirty milliliters of methanol, three milliliters of water, 0.4 gram of semicarbazide hydrochloride and 0.4 gram of sodium acetate. Upon cooling the reaction mixture the semicarbazone of 3-methoxy-pregnene-5-one-20 separated and after crystallization from a mixture of methanol and chloroform had a melting point of 225–237 degrees centigrade.

A solution of 240 milligrams of the above semicarbazone in fifty milliliters of methanol containing 25 milliliters of five normal sulfuric acid was heated under reflux for one-half hour. The solution was diluted with water, extracted with ether, the ethereal solution washed with water until neutral and dried. Upon removal of the ether, 192 milligrams of pregnenolone methyl ether was obtained which, after crystallization from dilute acetone melted at 124–125 degrees centigrade.

In a manner essentially as described pregnenolone cyclohexyl ether and pregnenolone benzyl ether can also be prepared.

Various modifications may be made in the present invention without departing from the spirit or scope thereof, and it is to be understood that we limit ourselves only as defined by the appended claims.

We claim:
1. A compound having the formula:

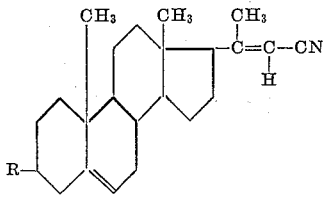

wherein R is selected from the group consisting of hydroxyl, hydrocarbonoxy and acyloxy groups, said groups having the formulas R'O— and R'COO—, respectively, wherein R' is selected from the group consisting of hydrogen and hydrocarbon radicals containing up to seven carbon atoms, inclusive.

2. A 3 - hydroxy - 22 - cyano - bisnor-5,20(22)-choladiene.

3. A 3 - methoxy - 22 - cyano-bisnor-5,20(22)-choladiene.

4. A 3 - acetoxy - 22 - cyano - bisnor-5,20(22)-choladiene.

5. 3 - acetoxy-22-cyano-bisnor-5,20(22)-choladiene, melting at 182 degrees centigrade.

6. 3 - acetoxy-22-cyano-bisnor-5,20(22)-choladiene, melting at 195 degrees centigrade.

7. In a process for the preparation of pregnenolone, the steps which include: heating, at a temperature between about fifty degrees centigrade and the boiling point of the reaction mixture under the conditions employed, a mixture of piperidine and a 3-substituted-22-cyano-22-halo-bisnor-5-cholene, wherein the halogen is selected from the group consisting of chlorine and bromine, and wherein the 3-substituent is selected from the group consisting of hydroxyl, hydrocarbonoxy, and acyloxy groups, said hydrocarbonoxy and acyloxy groups having the formulas RO— and RCOO—, respectively, wherein R is selected from the group consisting of hydrogen and hydrocarbon radicals containing up to eleven carbon atoms, inclusive.

8. In a process for the preparation of pregnenolone, the steps which include: heating, at a temperature between about fifty degrees centigrade and the boiling point of the reaction mixture under the conditions employed, a mixture of piperidine and a 3-substituted-22-cyano-22-halo-bisnor-5-cholene, wherein the halogen is selected from the group consisting of chlorine and bromine, and wherein the 3-substituent is selected from the group consisting of hydroxyl, hydrocarbonoxy, and acyloxy groups, said hydrocarbonoxy and acyloxy groups having the formulas RO— and RCOO—, respectively, wherein R is selected from the group consisting of hydrogen and hydrocarbon radicals containing up to eleven carbon atoms, inclusive; and, thereafter separating a 3 - substituted-22-cyano-bisnor-5,20(22)-choladiene from the reaction mixture.

9. In a process for the preparation of pregnenolone, the steps which include: heating, at a temperature between about fifty degrees centigrade and the boiling point of the reaction mixture under the conditions employed, a mixture of piperidine and a 3-substituted-22-cyano-22-halo-bisnor-5-cholene, wherein the halogen is selected from the group consisting of chlorine and bromine, and wherein the 3-substituent is selected from the group consisting of hydroxyl, hydrocarbonoxy, and acyloxy groups, said hydrocarbonoxy and acyloxy groups having the formulas RO— and RCOO—, respectively, wherein R is selected from the group consisting of hydrogen and hydrocarbon radicals containing up to eleven carbon atoms, inclusive; and, adding ozone to the resulting 3-substituted-22-cyano-bisnor-5,20(22)-choladiene while maintained at a temperature between about plus 20 and minus 80 degrees centigrade.

10. The process of claim 9, wherein the temperature is maintained between about zero and five degrees centigrade during the addition of the ozone.

11. In a process for the preparation of pregnenolone, the steps which include: heating, at a temperature between about fifty degrees centigrade and the boiling point of the reaction mixture under the conditions employed, a mixture of piperidine and a 3-substituted-22-cyano-22-halo-bisnor-5-cholene, wherein the halogen is selected from the group consisting of chlorine and bromine, and wherein the 3-substituent is selected from the group consisting of hydroxyl, hydrocarbonoxy, and acyloxy groups, said hydrocarbonoxy and acyloxy groups having the formulas RO— and RCOO—, respectively, wherein R is selected from the group consisting of hydrogen and hydrocarbon radicals containing up to eleven carbon atoms, inclusive; adding ozone to the resulting 3-substituted-22-cyano-bisnor-5,20(22)-choladiene while maintained at a temperature between about plus 20 and minus 80 degrees centigrade; and, decomposing the resulting ozonide.

12. The process of claim 11, wherein the decomposition is performed with zinc and acetic acid.

13. In a process for the preparation of pregnenolone, the steps which include: heating, at a temperature between about fifty degrees centigrade and the boiling point of the reaction mixture under the conditions employed, a mixture of piperidine and a 3-substituted-22-cyano-22-halo-bisnor-5-cholene, wherein the halogen is selected from the group consisting of chlorine and bromine, and wherein the 3-substituent is selected from the group consisting of hydroxyl, hydrocarbonoxy, and acyloxy groups, said hydrocarbonoxy and acyloxy groups having the formulas RO— and RCOO—, respectively, wherein R is selected from the group consisting of hydrogen and hydrocarbon radicals containing up to eleven carbon atoms, inclusive; adding ozone to the resulting 3-substituted-22-cyano-bisnor-5,20(22)-choladiene while maintained at a temperature between about plus 20 and minus 80 degrees centigrade; decomposing the resulting ozonide; and, isolating a 3-substituted pregnenolone from the reaction mixture.

14. In a process for the preparation of pregnenolone, the steps which include: heating at a temperature between about 50 degrees centigrade and the boiling point of the reaction mixture under the conditions employed, a mixture of piperidine and a 3-substituted-22-cyano-22-halo-bisnor-5-cholene, wherein the halogen is selected from the group consisting of chlorine and bromine, and wherein the 3-substituent is selected from the group consisting of hydroxyl, hydrocarbonoxy, and acyloxy groups, said hydrocarbonoxy and acyloxy groups having the formulas RO— and RCOO—, respectively, wherein R is selected from the group consisting of hydrogen and hydrocarbon radicals containing up to eleven carbon atoms, inclusive; separating a 3-substituted-22-cyano-bisnor-5,20(22)-choladiene from resulting mixture; adding at least an equivalent amount of ozone to said choladiene maintained at a temperature between about zero and five degrees centigrade; decomposing the resulting ozonide with zinc and acetic acid; and, separating a 3-substituted pregnenolone from the reaction mixture.

15. In a process for the preparation of pregnenolone, the steps which include: heating at a temperature between about 50 degrees centigrade and the boiling point of the reaction mixture under the conditions employed, a mixture of piperidine and a 3-substituted-22-cyano-22-halo-bisnor-5-cholene, wherein the halogen is selected from the group consisting of chlorine and bromine, and wherein the 3-substituent is selected from the group consisting of hydroxyl, hydrocarbonoxy, and acyloxy groups, said hydrocarbonoxy and acyloxy groups having the formulas RO— and RCOO—, respectively, wherein R is selected from the group consisting of hydrogen and hydrocarbon radicals containing up to eleven carbon atoms, inclusive; separating a 3-substituted-22-cyano-bisnor-5,20(22)-choladiene from the resulting mixture; adding bromine to said choladiene to brominate the 5:6-double bond thereof; adding at least an equivalent amount of ozone to the diene maintained at a temperature between about zero and five degrees centigrade; decomposing the resulting ozonide with zinc and acetic acid; and, separating a 3-substituted pregnenolone from the reaction mixture.

16. In a process for the preparation of pregnenolone, the step which includes: heating, at a temperature between about 50 degrees centigrade and the boiling point of the reaction mixture under the conditions employed, a mixture of piperidine and a 3-substituted-22-cyano-22-halo-bisnor-5-cholene, wherein the halogen is selected from the group consisting of chlorine and bromine, and wherein the 3-substituent is selected from the group consisting of hydroxyl, hydrocarbonoxy, and acyloxy groups, said hydrocarbonoxy and acyloxy groups having the formulas RO— and RCOO—, respectively, wherein R is selected from the group consisting of hydrogen and hydrocarbon radicals.

FREDERICK W. HEYL.
MILTON E. HERR.

No references cited.